United States Patent
Yuan (10) Patent No.: US 12,517,709 B2
(45) Date of Patent: Jan. 6, 2026

(54) METHOD FOR GENERATING DRIVER PACKAGE, METHOD FOR DEPLOYING DRIVER, ELECTRONIC DEVICE, AND COMPUTER READABLE STORAGE MEDIUM

(71) Applicant: Fulian Precision Electronics (Tianjin) Co., LTD., Tianjin (CN)

(72) Inventor: Jie Yuan, Tianjin (CN)

(73) Assignee: Fulian Precision Electronics (Tianjin) Co., LTD., Tianjin (CN)

(*) Notice: Subject to any disclaimer, the term of this patent is extended or adjusted under 35 U.S.C. 154(b) by 252 days.

(21) Appl. No.: 18/231,288

(22) Filed: Aug. 8, 2023

(65) Prior Publication Data
US 2024/0168732 A1  May 23, 2024

(30) Foreign Application Priority Data
Nov. 18, 2022 (CN) .......................... 202211449859.1

(51) Int. Cl.
*G06F 8/41* (2018.01)
(52) U.S. Cl.
CPC ....................... *G06F 8/41* (2013.01)
(58) Field of Classification Search
CPC ........................................................ G06F 8/41
USPC ........................................................ 717/140
See application file for complete search history.

(56) References Cited

U.S. PATENT DOCUMENTS

| | | | | |
|---|---|---|---|---|
| 8,533,707 B2* | 9/2013 | Mukker | ........... | G06F 9/441 717/176 |
| 11,561,790 B2* | 1/2023 | Miedema | ........... | G06F 8/60 |
| 2007/0101342 A1* | 5/2007 | Flegg | ........... | G06F 9/4411 719/321 |

FOREIGN PATENT DOCUMENTS

| CN | 103605520 A | 2/2014 |
|---|---|---|
| CN | 113849202 A | 12/2021 |
| CN | 114942784 A | 8/2022 |

OTHER PUBLICATIONS

Zagar et al., "Packaging of Control System Software", 2011, Proceedings of ICALEPCS2011, Grenoble, France, pp. 1168-1170. (Year: 2011).*
Miller et al., "RPM Packaging Guide", 2020, retrieved from https://web.archive.org/web/20201227192118/https://rpm-packaging-guide.github.io/ , 80 pages. (Year: 2020).*

* cited by examiner

*Primary Examiner* — Ted T. Vo
(74) *Attorney, Agent, or Firm* — ScienBiziP, P.C.

(57) ABSTRACT

A method for generating driver package is provided. The method is applied on a first electronic device. The method obtains a driver source code. The method generates specification files according to the driver source code. Where the specification files correspond to target operation systems of second electronic devices, and each specification file corresponds to environment information of one target operation system. The method generates driver packages using a first format according to the driver source code and the specification files. The method transmits each of the driver packages using the first format to a corresponding second electronic device of which a target operating system is different from an operating system of the first electronic device. A method for deploying driver and an electronic device are also disclosed.

5 Claims, 6 Drawing Sheets

METHOD FOR GENERATING DRIVER PACKAGE, METHOD FOR DEPLOYING DRIVER, ELECTRONIC DEVICE, AND COMPUTER READABLE STORAGE MEDIUM

FIELD

The subject matter herein generally relates to a computer technology, and particularly to a method for generating driver package, a method for deploying driver, an electronic device, and a computer readable storage medium.

BACKGROUND

Under an open-source policy of Linux, a number of cloud computing vendors can usually tailor operating systems on a basis of a standard operating system according to a number of needs of themselves, to optimize application scenarios. However, the tailored operating systems may be different, and a driver may need different changes to match with different tailored operating systems, and a hardware device corresponding to the driver can accordingly operate normally on different tailored operating systems. The hardware device can be an input unit, a display device, or the like.

For a tailored operating system or a specific operating system which is a non-mainstream edition, to control the hardware device to work normally, the file of the driver of the hardware device is downloaded from an official website of the hardware device. And, the file of the driver is installed, recompiled, and reconfigured, then the file of the driver after the installation, the recompilation, and the reconfiguration can be installed normally and operate normally. Thus, a deployment of the driver on the tailored operating system or the specific operating system is completed, and the tailored operating system or the specific operating system can accordingly control the hardware device to work normally. However, for a number of electronic devices, a number of different operating systems may be needed. And the driver may need different changes to match with the different operating systems. According to an existing method such as the installing, the recompilation, and the reconfiguration method, it is difficult to achieve an agile deployment of the driver on the electronic devices with different operating systems, and it may consume enormous time and enormous cost during a deployment of the driver on the electronic devices with different operating systems.

SUMMARY

An embodiment of the present application provides a method for generating driver package, a method for deploying driver, an electronic device, and a computer readable storage medium capable of deploying the driver quicker, more agile, and more convenient.

In a first aspect, an embodiment of the present application provides a method for generating driver package. The method for generating driver package is applied on a first electronic device. The method for generating driver package obtains a driver source code. The method further generates one or more specification files according to the driver source code. Where the one or more specification files correspond to one or more target operation systems of one or more second electronic devices, and each of the one or more specification files corresponds to environment information of one of the one or more target operation systems. The method generates one or more driver packages using the first format according to the driver source code and the one or more specification files. Where each of the one or more driver packages using the first format corresponding to one of the one or more specification files. The method transmits each of the one or more driver packages using the first format to a corresponding second electronic device of which a target operating system is different from an operating system of the first electronic device.

According to some embodiments of the present application, the method stores the driver source code to a first preset directory, stores the one or more specification files to a second preset directory, and generates the one or more driver packages using the first format according to the driver source code in the first preset directory and the one or more specification files in the second preset directory.

According to some embodiments of the present application, the method receives a command for generating the one or more driver packages using the first format in the second preset directory. The method generates the one or more driver packages using the first format according to the driver source code in the first preset directory and the one or more specification files in the second preset directory in response to the command for generating the one or more driver packages using the first format in the second preset directory.

According to some embodiments of the present application, the method defines basis information of each of the one or more driver packages using the first format according to the driver source code. The method further generates the one or more specification files according to the basis information of each of the one or more driver packages using the first format and the driver source code.

In a second aspect, an embodiment of the present application provides a method for deploying driver. The method for deploying driver is applied on a second electronic device. The method for deploying driver obtains a driver package using a first format from a first electronic device. The method installs the driver package using the first format. The method compiles the driver package using the first format to the driver package using the second format.

According to some embodiments of the present application, the method generates one or more configuration files and a driver file according to a driver source code and a specification file, and compiles the driver package using the first format to the driver package using the second format. Where the driver package using the first format comprising the driver source code and the specification file.

According to some embodiments of the present application, the method stores the driver file into a first path of a first preset directory. The method stores the one or more configuration files into a second path of a second preset directory. The method further integrates the driver file in the first path of the first preset directory and the one or more configuration files in the second path of the second preset directory to a launch list.

According to some embodiments of the present application, the method regenerates an image file of a kernel, and causes the one or more configuration files to be validation.

According to some embodiments of the present application, the method transmits the driver package using the second format to other one or more preset electronic devices, and prompts the other one or more preset electronic devices to install the driver package using the second format. Where each of the other one or more preset electronic devices comprising an operating system the same as a target operating system of the second electronic device.

In a third aspect, an embodiment of the present application provides an electronic device. The electronic device includes a storage device and at least one processor. The storage device stores one or more programs, which when executed by the at least one processor, cause the at least one processor to obtain a driver package using a first format from another electronic device, install the driver package using the first format, and compile the driver package using the first format to the driver package using the second format.

The disclosure obtains the driver source code, and generates one or more specification files according to the driver source code. Where the one or more specification files correspond to one or more target operation systems of one or more second electronic devices, and each of the one or more specification files corresponds to environment information of one of the one or more target operation systems. The disclosure further generates one or more driver packages using the first format according to the driver source code and the one or more specification files, each driver package using the first format corresponding to one specification file. The disclosure further transmits each of the one or more driver packages using the first format to a corresponding second electronic device of which the target operating system is different from an operating system of the first electronic device. Thus, different target operating systems each can obtain a corresponding driver package using the first format from the driver development platform system, and deploy the corresponding driver package using the first format on the target operating system. The target operating systems do not need to generate the specification file anymore, thus the quicker, more agile, and more convenient deployment of the driver can be achieved.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

A brief description of a related technology is as follows.

Under an open-source policy of Linux, a number of cloud computing vendors can usually tailor operating systems on a basis of a standard operating system according to a number of needs of themselves, to optimize application scenarios. However, the tailored operating systems may be different, and a driver may need different changes to match with different tailored operating systems, and a hardware device corresponding to the driver can accordingly operate normally on different tailored operating systems. The hardware device can be an input unit, a display device, or the like.

The official website of the hardware device usually releases a related file of the driver which is complied for the standard operating system, and the related file of the driver can be directly installed on the standard operating system. For a tailored operating system or a specific operating system which is a non-mainstream edition, to control the hardware device to work normally, the related file of the driver of the hardware device is downloaded from the official website of the hardware device. And, the file of the driver is installed, recompiled, and reconfigured, then the file of the driver after the installation, the recompilation, and the reconfiguration can be installed normally on the tailored operating system or the specific operating system, and can operate normally. Thus, a deployment of the driver on the tailored operating system or the specific operating system is completed, and the tailored operating system or the specific operating system can accordingly control the hardware device to work normally. During recompiling the file of the driver, to be compatible with the tailored operating system or the specific operating system, the source code of the driver may be needed to be amended. And to satisfy a requirement of a user, the file of the driver may be configurated, for example, be configured one or more configuration files capable of being automatically loaded when the tailored operating system or the specific operating system is restarted. Thus, the driver can be automatically load and run when the tailored operating system or the specific operating system is restarted.

And, the tailored operating system or the specific operating system usually is installed on the electronic device such as a server, then the user can operate the tailored operating system or the specific operating system. However, when there are may servers and the tailored operating systems or the specific operating systems installed on the servers are different, the servers need to installing, the recompilation, and the reconfiguration the file of the driver, to cause the driver to operate normally. However, it is difficult to achieve an agile deployment of the driver on the servers with different operating systems, and it may consume enormous time and enormous cost during a deployment of the driver on the servers with different operating systems.

A driver installation package of the embodiment is referred to simply as a driver package.

In the embodiment, a method for generating driver package, a method for deploying driver, an electronic device, and a computer readable storage medium each is capable of deploying the driver quicker, more agile, and more convenient.

Figure 1:
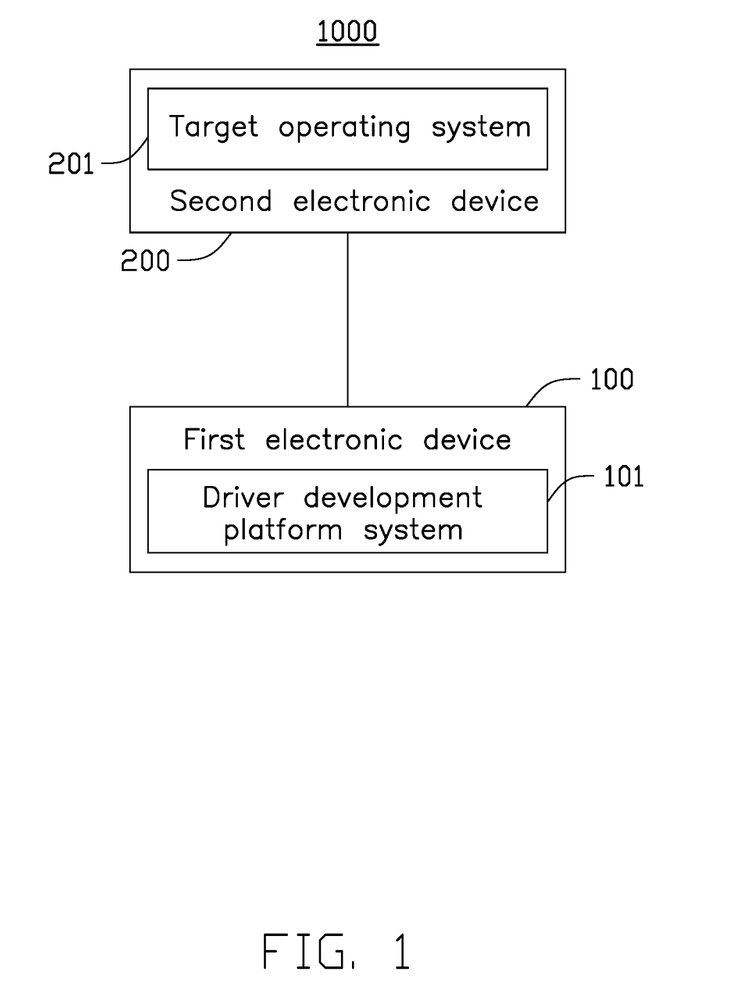
FIG. 1 is an application scenario view of an embodiment of a method for generating driver package and a method for deploying driver.

Referring to FIG. 1, a system for deploying driver 1000 is an application scenario of a method for generating driver package and a method for deploying driver of the embodiment. Namely, the method for generating driver package can be applied on the system for deploying driver 1000 of FIG. 1, and the method for deploying driver can also be applied on the system for deploying driver 1000 of FIG. 1. The system for deploying driver 1000 includes a first electronic device 100 and a second electronic device 200. The first electronic device 100 includes a driver development platform system 101. The second electronic device 200 includes a target operating system 201. The driver development platform system 101 can transmit a driver package using a srpm format to the target operating system 201.

The driver development platform system 101 can generate the driver package using the srpm format and transmit the driver package using the srpm format to the target operating system 201 via the method for generating driver package of the disclosure. The target operating system 201 can install the driver package using the srpm format, and compile the driver package using the srpm format to the driver package using the rpm format which matches an environment information of the target operating system 201. In some embodiments, the target operating system 201 can install the driver package using the rpm format to install the driver. And, the second electronic device 200 including the target operating system 201 can be restarted. The target operating system 201 of the second electronic device 200 can restart accordingly. When the target operating system 201 of the second electronic device 200 restarts, the target operating system 201 can automatically load the driver according to the driver package using the rpm format, and control the hardware device corresponding to the driver to operate normally. For example, when the target operating system 201 of the second electronic device 200 restarts, the target operating system 201 can automatically load the driver of a display screen to drive the display screen to work according to the driver package of the display screen using the rpm format.

Where, the electronic device can be a server, a personal computer, or the like. The hardware device can be a display screen, an input device, a mainboard, an expansion card, a power supply, or a central processing unit (CPU), or the like.

It can be understood that, the driver development platform system 101 is the operating system capable of generating the driver package using the srpm format, and the driver development platform system 101 can further be the operating system capable of generating the driver package using the rpm format according to the driver package using the srpm format. And, the target operating system 201 is the operating system capable of generating the driver package using the rpm format according to the driver package using the srpm format, and the target operating system 201 can further be the operating system capable of generating the driver package using the srpm format. The disclosure is not limited herein.

To accurately describe technical solutions of the disclosure, and to accurately understood the disclosure, an expository or a definition is given to the terms used in the present description before illustrating a detailed description.

Driver is a computer software term. A full name of the driver is a device driver. The driver is a program capable of enabling a communication between the electronic device and the hardware device. The driver is equivalent to an interface of the hardware device. The operating system can control the operation of the hardware device via the interface. For example, the driver of one hardware device is not installed, the operating system cannot identify the hardware device, and cannot control the hardware device to perform a corresponding function. In the embodiment, the file of the driver of the hardware device can be downloaded from the official website of the hardware device. The downloaded file of the driver can include a file of the driver for the standard operating system which is compiled completely and a driver source code package.

The source code is a code of the most original program.

A full name of Linux is GNU/Linux. Linux is a UNIX-like operating system, and is a POSIX-based multi-user and multi-task operating system that supports multiple threads and multiple CPUs.

A spec file is a specification file. The spec file is configured to guide the driver development platform system to generate the driver package using the srpm format and guide the target operating system to generate the driver package using the rpm format in the Linux operating system according to one or more rpmbuild commands and the driver package using the srpm format. Namely, the spec file can be firstly generated, and then the driver development platform system and the target operating system can perform a corresponding operation according to the spec file and the one or more rpmbulid commands. Thus, the driver package using the srpm format and the driver package using the rpm format are generated.

The programs in the driver package using the srpm format is not compiled, and the programs in the driver package using the rpm format is compiled completely. Namely, after the driver package using the srpm is compiled completely, the driver package using the rpm is generated. Thus, the code in the driver package using the srpm format can be the source code, and the code in the driver package using the rpm format can be not the source code.

The method for generating driver package and the method for deploying driver can be performed in the Linux operating system.

Figure 2:
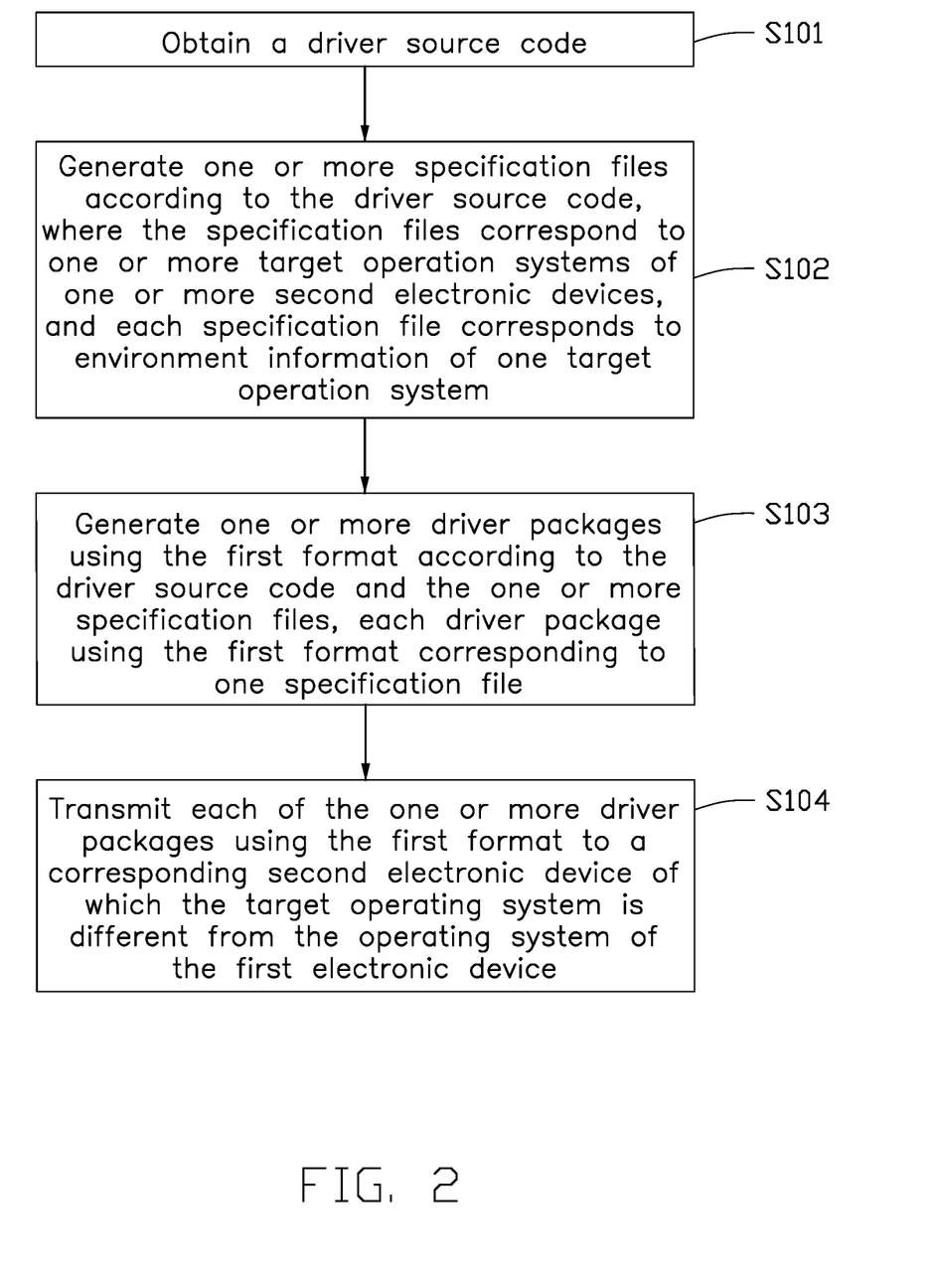
FIG. 2 is a flowchart of an embodiment of a method for generating driver package.

Referring also to FIG. 2, a method for generating driver package is shown. The method for generating driver package can be applied on the first electronic device. The method for generating driver package can include:

S101: obtaining a driver source code.

The driver development platform system can download the file of the driver including the driver source code package from the official website of the hardware device, to obtain the driver source code.

For example, the driver development platform system of the first electronic device can obtain the file of the driver of the input device including the driver source code package of the input device from the official website, to obtain the driver source code of the input device from the driver source code package of the input device.

It can be understood that, the driver source code can be obtained via other manners, for example, the driver source code can be obtained from the driver source code of other tailored operating systems excluding the target operating system, the disclosure is not limited herein.

S102: generating one or more specification files according to the driver source code, where the specification files correspond to one or more target operation systems of one or more second electronic devices, and each specification file corresponds to environment information of one target operation system.

For simplicity, one specification file is taken as an example to illustrate the disclosure.

The specification file can be a spec file. The driver development platform system can generate the spec file according to the driver source code. After the driver development platform system generates the spec file, following, the driver development platform system and the target operating system can execute corresponding operations according to the spec file, to achieve the operations of the driver package using the srpm format and the driver package using the rpm format in a number of stages, and so on.

In detail, the spec file can include three parts. The first part is a related description of the driver package. The second part is a description of the operations on the driver package in different stages. The third part is a description of configuration information of the driver package. The different stages can include a pre-compiling stage, a compiling stage, an installing stage, a cleaning stage, a pre-install phase, a post-installation phase, a pre-uninstall phase, and a post-uninstallation phase. In some embodiments, in the pre-compiling stage of the spec file, the spec file can describe an operation of decompressing the driver source code package and generating one or more configuration files capable of being automatically loaded when an electronic device installing the driver is restarted. For example, the spec file can describe an operation of generating a depmod configuration file and a darcut configuration file. In the compiling state of the spec file, the spec file can describe an operation of compiling the driver package using the srpm format to the driver package using the rpm format. In the installing state of the spec file, the spec file can describe an operation of installing a ko file, a depmod configuration file, and a dracut configuration file to a corresponding installation path by installing the driver package using the rpm format. In the cleaning state of the spec file, the spec file can describe an operating of cleaning redundant intermediate files. In the post-installation phase of the spec file, the spec file can describe an operation of validating the depmod configuration file and the darcut configuration file. In the post-uninstallation phase of the spec file, the spec file can describe an operation of invalidating the depmod configuration file and the darcut configuration file. Where, before a pre-compilation is completely, the driver package can be the driver package using the srpm format. After the compilation is completely, the driver package can be the driver package using the rpm format. In some embodiments, for example, the method can generate the spec file according to the following code:

Firstly, the related description of the driver package in the first part is as follows:

```
    Summary: %{module} kernel module(s)           # related description of the
driver package;
    Name: kmod-%{module}                          # name of the driver package;
    Version: %{version}                           # master version number of the driver;
    Release: %{release}                           # issued serial number of the driver;
    License: GPLv2                                # authorization mode;
    Source0: %{module}-%{version}-src.tar.gz      # driver source code
package;
    Where, %{module}, %{version}, %{kernel} are a number of self-defined macros,
and are usually defined in a head of the spec file.
```

Secondly, a description of the operation of the driver package in the different stages in the second part is as follows:

```
    %prep # pre-compiling stage;
    %setup -c -q                              # decompress a driver source code package;
    echo override %{module} 'uname -r | awk -F "-" '{print $1}'"-* weak-
updates/%{module} > $RPM_SOURCE_DIR/%{module}-depmod.conf;          #
generate the depmod configuration file;
    echo add_drivers+=\" %{module} \" > $RPM_SOURCE_DIR/%{module}-
dracut.conf;                              # generate the darcut configuration file;
    %build # compiling stage;
    cd ./%{module}/                           #access a compiling directory;
    ./compile.sh                              #execute a compiling script of the driver source code
package;
    cp %{module}.ko $RPM_SOURCE_DIR/            #copy the compiled
driver package;
    %install # installing stage;
    install -m 644 -D                                      $RPM_SOURCE_DIR/%{module}.ko
$RPM_BUILD_ROOT/lib/modules/%-{kernel}/extra/%{module}/%{module}.ko
    #assign the installation path of the KO file of the driver package;
    install -m 644 -D                         $RPM_SOURCE_DIR/%{module}-depmod.conf
$RPM_BUILD_ROOT-/etc/depmod.d/%{module}.conf            #assign the installation
path of the depmod configuration file of the driver package;
    install -m 644 -D                         $RPM_SOURCE_DIR/%{module}-dracut.conf
$RPM_BUILD_ROOT-/etc/dracut.conf.d/%{module}.conf       #assign the
installation path of the dracut configuration file of the driver package;
    %clean # cleaning stage;
    rm                               -rf                  $RPM_SOURCE_DIR/-%{module}.ko
$RPM_SOURCE_DIR/-%{module } depmod.conf-         $RPM_SOURCE_DIR/-%{module}-
dracut.conf                    # clean a number of generated redundant intermediate files;
    %post #post-installation phase;
    depmod                                    #validate the depmod configuration file and the darcut
configuration file;
    dracut -f
    Where, $RPM_SOURCE_DIR is a global variable, and points to a path
/root/rpmbuild/SOURCES.
```

Finally, a description of configuration information of the driver package using the rpm format in the third part. The configuration information can include a listing of a number of files to be installed and a change log of the version of the driver package. For example, a description of the configuration information of the driver package using the rpm format in the third part can be as follows:

```
%files #listing of the files to be installed;
%defattr(644,root,root,755)    #set default permission of the files;
/lib/modules/%{kernel}-/extra/%{module}/%{module}.ko;
/etc/depmod.d/%{module}.conf;
/etc/dracut.conf.d/%{module}.conf;
```

It can be understood that, the first part, the second part, and the third part can total be a part of spec file, the spec file can include other information, the disclosure is not limited herein.

In one embodiment, after the driver development platform system obtains the driver source code, the driver development platform system can generate the spec file according to the driver source code. In detail, the spec file describes how to generate the driver package using the srpm format. Then, the spec file describes how to generate the driver package using the rpm format according to the srpm format in the pre-compiling state and the compiling state. The spec file further describes how to install the driver package using the rpm format and so on. Thus, the spec file is generated.

In some embodiments, the spec file can be generated automatically according to the environment information of the target operation system of the second electronic device and the driver source code. It can be understood that, the spec file can be a pre-written file by the user, the disclosure is not limited herein.

It can be understood that, according to different related descriptions of the driver packages, different spec files can be generated.

S103: generating one or more driver packages using the first format according to the driver source code and the one or more specification files, each driver package using the first format corresponding to one specification file.

The driver package using the first format can be the driver package using the srpm format. The driver development platform system can generate each driver package using the srpm format according to the driver source code and a corresponding spec file.

S104: transmitting each of the one or more driver packages using the first format to a corresponding second electronic device of which the target operating system is different from the operating system of the first electronic device.

The spec file can describe how to generate the driver package using the srpm format and the driver package using the rpm format, describe which files are installed on the target operating system, describe an installation directory when the driver package using the rpm format is installed on the target operating system, and describe one or more system activities are invoked when the driver package using the rpm format is installed on the target operating system, and so on. Thus, the method can tailor the driver package using the srpm format, and after the tailored driver package using the srpm format is installed and compiled on the targe operating system, a tailored driver package using the rpm format which matches the environment information of the target operating system can be generated.

It can be understood that, the driver development platform system can tailor one or more driver packages using the srpm format according to one or more spec files. Following, the target operating systems each can deploy a driver matching the target operating system according to a corresponding driver package using the srpm format. Thus, the target operating systems does not need to generate the spec files anymore. And, the tailored driver packages using the srpm format can be installed on the target operating systems different from the driver development platform system, thus the driver packages using the rpm format matching the different operating systems can be generated. Following, each tailored driver package using the rpm format can be installed on other electronic devices of which the operation systems each is the same as the target operating system. Other electronic devices each can control the corresponding hardware device to operate normally via the driver in response to a restarting of the operating system. Thus, other electronic devices each does not need to compile and configure the corresponding driver package using the srpm anymore. A quicker, more agile, and more convenient deployment of the driver can be achieved.

The driver development platform system can obtain the driver source code, and generate one or more specification files according to the driver source code. Where the one or more specification files correspond to one or more target operation systems of one or more second electronic devices, and each of the one or more specification files corresponds to environment information of one of the one or more target operation systems. The driver development platform system can further generate one or more driver packages using the first format according to the driver source code and the one or more specification files, each driver package using the first format corresponding to one specification file. The driver development platform system can further transmit each of the one or more driver packages using the first format to a corresponding second electronic device of which the target operating system is different from an operating system of the first electronic device. Thus, different target operating systems each can obtain a corresponding driver package using the first format from the driver development platform system, and deploy the corresponding driver package using the first format on the target operating system. The target operating systems does not need to generate the spec file anymore, thus the quicker, more agile, and more convenient deployment of the driver can be achieved.

In some embodiments, S103 can include:

S201: storing the driver source code to a first preset directory.

To generate the driver package using the srpm format, a packaging environment is needed to be prepared. In the embodiment, a working directory storing the files is needed to be prepared. The driver development platform system can generate a rpmbuild working directory according to a #rpmdev-setuptree command. Following, the files generated according to other commands can be stored in the rpmbuilding working directory. Where, the rpmbuilding working directory includes a directory configured to store the spec file, which can be ~/rpmbuild/SPECS/via the code. The rpmbuilding working directory further includes a directory configured to store the source code, which can be ~/rpmbuild/SOURCES/via the code. The rpmbuilding working directory further includes a directory configured to store the driver package using the srpm format, which can be ~/rpmbuild/SRPMS/via the code.

After the driver development platform system generates the spec file, the driver development platform system can respectively store the spec file and the driver source code to the rpmbuild working directory. And then in the directory where the spec file is stored, a rpmbuild command is executed, thus the driver development platform system can generate the driver package using the srpm format. Finally, the driver development platform system can store the driver package using the srpm format to the rpmbuild working directory.

The driver development platform system can store the driver source code to the directory configured to store the source code. Namely, the first preset directory can be a directory configured to store the source code, which can be ~/rpmbuild/SOURCES/via the code.

S202: storing the specification file to a second preset directory.

The driver development platform system can store the specification file to the directory configured to store the specification file. Namely, the second preset directory can be the directory configured to store the specification file, which can be ~/rpmbuild/SPECS via the code.

S203: generating the driver package using the first format according to the driver source code in the first preset directory and the specification file in the second preset directory.

The driver development platform system can store the driver source code to the first preset directory in response to a first input of the user, and store the specification file to the second preset directory in response to a second input of the user.

It can be understood that, the driver development platform system can automatically store the driver source code to the first preset directory and automatically store the specification file to the second preset directory, the disclosure is not limited herein.

The S203 includes:

S301: receiving a command for generating the driver package using the first format in the second preset directory.

In some embodiments, the command for generating the driver package using the first format can be a rpmbuild-bs <spec> command.

S302: generating the driver package using the first format according to the driver source code in the first preset directory and the specification file in the second preset directory in response to the command for generating the driver package using the first format in the second preset directory.

In an example, the spec file is moved into the/root/rpmbuild/SPECS, and the driver source code is moved into the/root/rpmbuild/SOURCES, then the rpmbuild-bs <spec> command can be input in the/root/rpmbuild/SPECS, thus the driver package using the srpm format can be generated.

Then, the driver package using the srpm format can be moved into the /root/rpmbuild/SRPMS/.

It can be understood that, the spec file and the driver source code each is stored in a corresponding preset directory, thus it is convenient for the driver development platform to find the spec file and the driver source code. The driver development platform can generate the driver package using the srpm format according to the found spec file and the found driver source code. And, the driver package using the srpm format is stored in another corresponding preset directory, thus it is convenient for the driver development platform to find the driver package using the srpm format.

Thus, the method stores the driver source code to the first preset directory, stores the specification file to the second preset directory, and generates the driver package using the first format according to the driver source code in the first preset directory and the specification file in the second preset directory. Via storing the driver source code and the specification file in the corresponding directory, it is convenient for the driver development platform system to find the driver source code and the specification file, thus the driver development platform system can generate the driver package using the first format according to the found driver source code and the found specification file.

In some embodiments, generating one or more specification files according to the driver source code can include:

S401: defining basis information of each driver package using the first format according to the driver source code.

In the embodiment, before generating the specification files, the driver development platform can first define the basis information of each driver package using the srpm format. The basis information includes a name, a version number, a release serial number, and a license.

Namely, the driver development platform can define the related description of the driver package using the srpm format in the first part. The related description of the driver package can include a content summary for describing the driver package, a name of the driver package, a version number of the driver package, a release serial number of the driver package, and a license of the driver package, and a source code package of the driver source code. Where, the license of the driver package can use the GPLv2. In some embodiments, a tag of the content summary for describing the driver package can be a Summary, a tag of the name of the driver package can be a Name, a tag of the version number of the driver package can be a Version, a tag of the release serial number of the driver package can be a Release, a tag of the license of the driver package can be a License, and a tag of the source code package of the driver source code can be a Source. For example, the related description of the driver package using the srpm format via the code is as follows:

```
Summary: %{module} kernel module(s)        #related description of the
driver package;
  Name: kmod-%{module}                     # name of the driver package;
  Version: %{version}                      # master version number of the driver;
  Release: %{release}                      # issued serial number of the driver;
  License: GPLv2                           # authorization mode;
  Source0: %{module}-%{version}-src.tar.gz          # driver source code
package.
```

It can be understood that, the related description of the driver package in the first part can include other information, the disclosure is not limited herein.

S402: generating the one or more specification files according to the basis information of each driver package using the first format and the driver source code.

It can be understood that, the method defines the basis information of each driver package using the srpm format, following, the generated driver package using the rpm format can meet the environment of the target operation system. Thus, a problem that the generated driver package using the rpm format does not meet the target operation system and cannot be installed on the target operation system can be avoided. Thus, via the basis information of each driver package using the srpm format, the generated driver package using the rpm format can meet the environment of the target operation system and can be installed on the target operation system.

A method for deploying driver is provided. The method for deploying driver can be applied on the second electronic device in FIG. 1.

Figure 3:
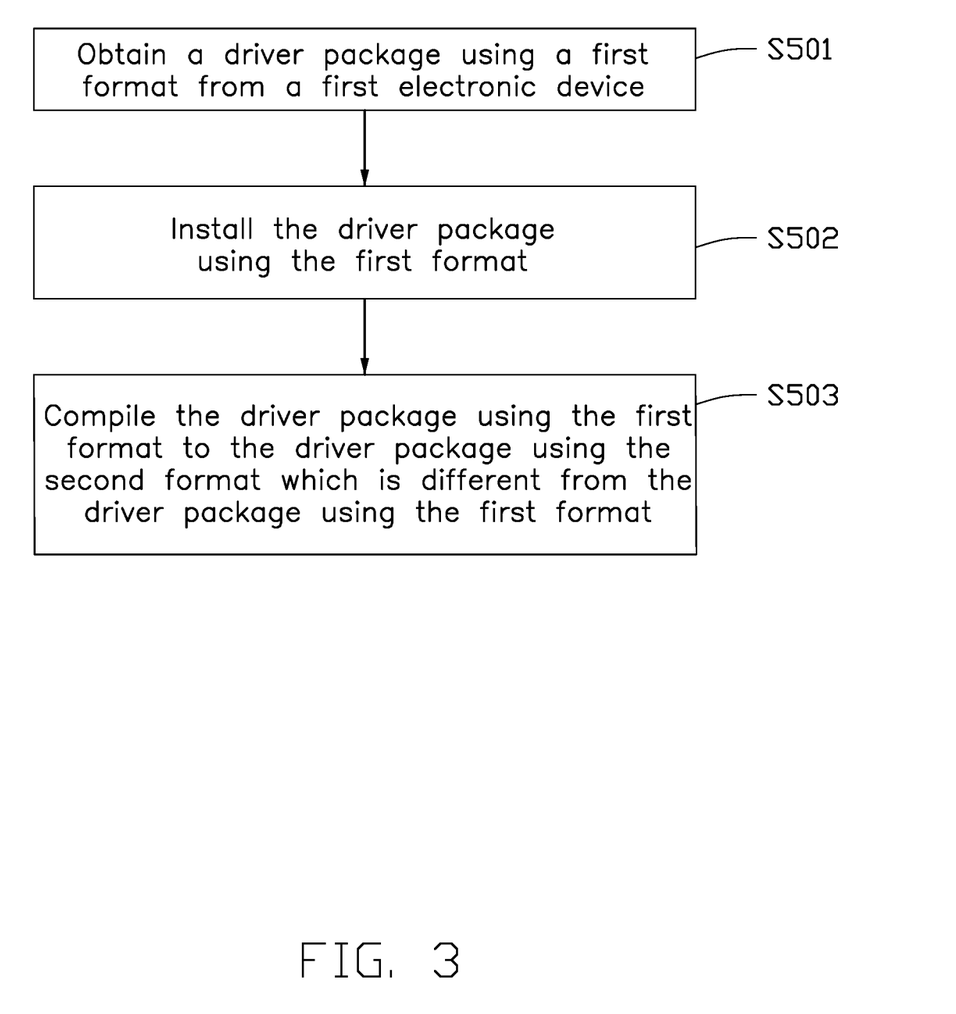
FIG. 3 is a flowchart of an embodiment of a method for deploying driver.

Referring to FIG. 3, a method for deploying driver is shown. The method for deploying driver can include:

S501: obtaining a driver package using a first format from a first electronic device.

The driver package using the first format can be the driver package generated according to the method for generating driver package. The driver package using the first format can be the driver package using the srpm format. The second electronic device can obtain the driver package using the srpm format from the first electronic device. In some embodiments, the target system of the second electronic device can obtain the driver package using the srpm format from the driver development platform of the first electronic device.

S502: installing the driver package using the first format.

In some embodiments, after the target operation system obtains the driver package using the srpm format, a rpm -ivh<srpm> command is executed, thus the driver package using the srpm format can be installed on the target operation system.

S503: compiling the driver package using the first format to the driver package using the second format which is different from the driver package using the first format.

The driver package using the second format can be the driver package using the rpm format. The driver package using the srpm format can be compiled to form the driver package using the rpm format. Thus, comparing to the driver package using the srpm format, the programs in the driver package using the rpm format is not the source code, and the programs in the driver package using the srpm format is the source code.

In some embodiments, after the target operation system installs the driver package using the srpm format, a rpm -bb <spec> command is executed, thus the driver package using the srpm format can be compiled to be the driver package using the rpm format.

In one embodiment, after the driver development platform of the first electronic device generates the driver package using the srpm format, the driver development platform of the first electronic device can transmit the driver package using the srpm format to the target operation system of the second electronic device. The target operation system can execute the rpm -ivh<srpm> command in response to a third input of the user, for example in response to an inputting of the rpm -ivh<srpm> command of the user, to install the driver package using the srpm format on the target operation system. Then, the target operation system can jump to the directory storing the spec file in response to a fourth input of the user, for example in response to an inputting of the directory storing the spec file. The directory storing the spec file can be, for example /root/rpmbuild/SPECS/. The target operation system can further execute the rpm -bb <spec> command in response to a fifth input of the user, for example in response to an inputting of the rpm -bb <spec> command of the user, to compile the driver package using the srpm format to the driver package using the rpm format. Thus, the driver package using the rpm format can be generated. In a directory storing the driver package using the rpm format, for example, in a directory /root/rpmbuild/RPMS/, the driver package using the rpm format can be found.

It can be understood that, the driver development platform system can automatically execute the rpm -ivh<srpm> command, automatically jump to the directory storing the spec file, and automatically execute the rpm -bb<spec> command, the disclosure is not limited herein.

In one embodiment, after the target operation system of the second electronic device generates the driver package using the rpm format, namely deploys the driver package using the rpm format, the target operation system of the second electronic device can install the driver package using the rpm format. Then, the second electronic device can automatically restart or restart in response to user operation, the target operation system can restart accordingly. The target operation system can automatically load the driver according to the one or more configuration files of the driver package using the rpm format, and control the hardware device to work normally.

Figure 4:
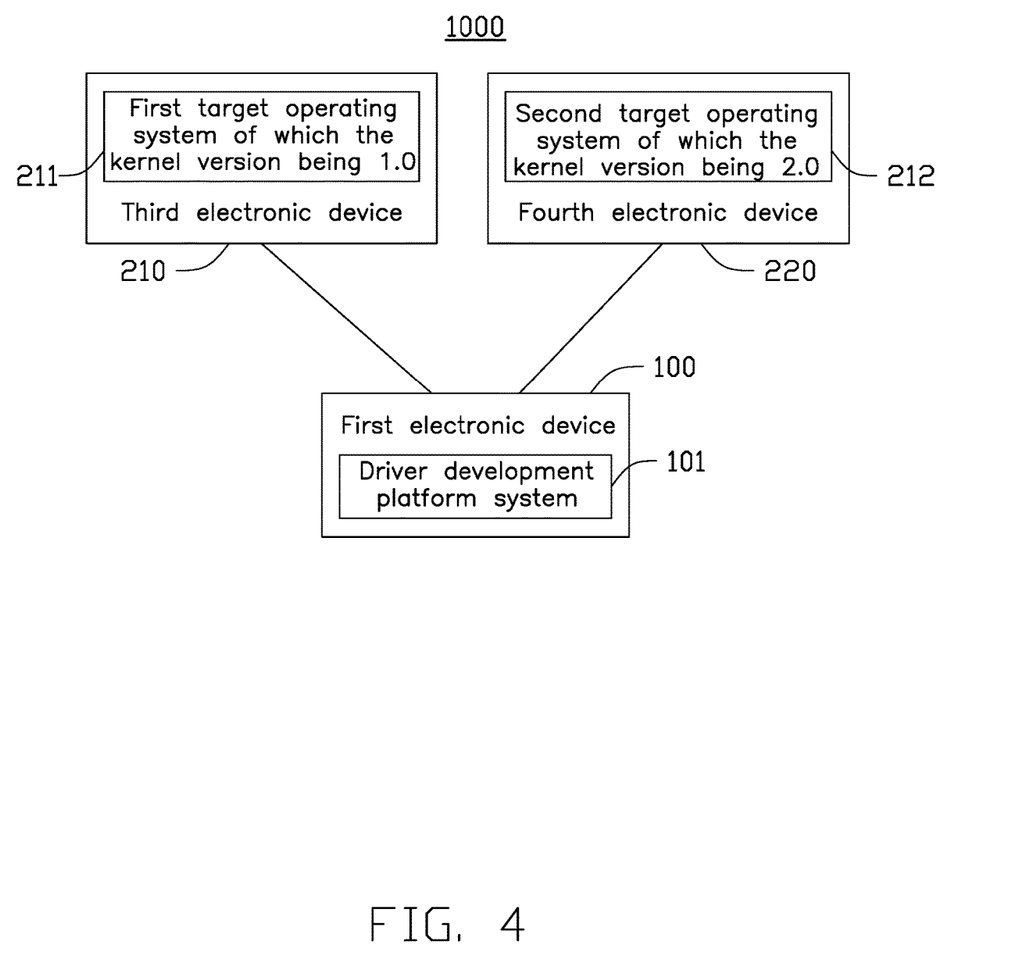
FIG. 4 is an application scenario view of an embodiment of a method for deploying driver.

In an application scenario, the system for developing driver 1000 shown in FIG. 4 can be taken as an example to illustrate the application scenario of the disclosure. The first electronic device 100 includes the driver development platform system 101. A third electronic device 210 includes a first target operating system 211 of which the kernel version is 1.0. A fourth electronic device 220 includes a second target operating system 212 of which the kernel version is 2.0.

The first electronic device 100 including the driver development platform system 101 can simultaneously generate a first driver package using the srpm format and a second driver package using the srpm format according to the environment information of the first target operating system 211 and the environment information of the second target operating system 212. The first electronic device 100 including the driver development platform system 101 can transmit the first driver package using the srpm format and the second driver package using the srpm format respectively to the third electronic device having the first target operating system 211 of which the kernel version is 1.0 and the fourth electronic device having the second target operating system 212 of which the kernel version is 2.0.

The third electronic device can execute the rpm -ivh<srpm> command, and to install the first driver package using the srpm format on the first target operation system whose kernel version is 1.0. Then, the third electronic device can jump to the directory storing the spec file, for example /root/rpmbuild/SPECS/. The third electronic device can further execute the rpm -bb<spec> command, and to complete a compilation of the first driver package using the srpm format on the first target operating system 211 of which the kernel version is 1.0, thus the first driver package using the rpm format which is used to be deployed on the first target operating system 211 of which the kernel version is 1.0 can be obtained. In the directory storing the first driver package using the rpm format, for example, in the directory /root/rpmbuild/RPMS/, the first driver package using the rpm format can be found and be installed on the third electronic device. And, in response to a restarting of the third electronic device, the third electronic device can automatically load the driver according to the one or more configuration files, and control the hardware device of the third electronic device to work normally via the driver.

And, the fourth electronic device can execute the rpm -ivh<srpm> command, installing the second driver package using the srpm format on the second target operation system of which the kernel version is 2.0. Then, the fourth electronic device can jump to the directory storing the spec file, for example /root/rpmbuild/SPECS/. The fourth electronic device can further execute the rpm -bb<spec> command, and to complete a compilation of the second driver package using the srpm format on the second target operating system 212 of which the kernel version is 2.0, thus the second driver package using the rpm format which is used to be deployed on the second target operating system 212 of which the kernel version is 2.0 can be obtained. In the directory storing the second driver package using the rpm format, for example, in the directory /root/rpmbuild/RPMS/, the second driver package using the rpm format can be found and be installed on the fourth electronic device. And, in response to a restarting of the fourth electronic device, the fourth electronic device can automatically load the driver according to the one or more configuration files, and control the hardware device of the fourth electronic device to work normally via the driver.

It can be understood that, each electronic device including a corresponding target operating system can obtain a corresponding driver package using the srpm format from the driver development platform system 101, and deploy the driver matching the corresponding target operating system according to the corresponding driver package using the srpm format. Each electronic device including a corresponding target operating system does not need to configure the corresponding driver package using the srpm anymore. A quicker, more agile, and more convenient deployment of the driver can be achieved.

Thus, the electronic device including the target operating system can obtain the driver package using the first format from the driver development platform system 101, install the driver package using the first format, and compile the driver package using the first format to the driver package using the second format. The target operating system can further install the driver package using the second format. The target operating system can further control the hardware device to work according to the one or more configuration files in response to a restarting of the target operating system. Thus, each target operating system can compile the driver package using the first format to generate the driver package using the second format. A problem that the driver package using the first format cannot be installed on the electronic device including the corresponding target operating system can be avoided due to a difference between the driver development platform system 101 and the corresponding target operating system.

In some embodiments, the S503 further includes:

S601, generating the one or more configuration files and a driver file according to the driver source code and the specification file, and compiling the driver package using the first format to the driver package using the second format.

To achieve the target operating system automatically load the driver when the electronic device installing the driver is restarted, one or more commands are needed to be executed, for example a depmod command and a dracut command. The driver can accordingly be automatically loaded after the electronic device is restarted. Thus, the one or more configuration files automatically loaded when the target operating system is restarted is the configuration file corresponding to the commands, for example, a depmod configuration file, and a dracut configuration file. Namely, the one or more configuration files are one or more files configured to automatically load the command for the target operating system.

In one embodiment, the target operating system can execute the pre-compiling stage as follows:

```
%prep # pre-compiling stage;
%setup -c -q  # decompress the driver source code package;
echo override %{module} 'uname -r | awk -F "-" '{print $1}'"-* weak-updates/%{module} > $RPM_SOURCE_DIR/%{module}-depmod.conf
  #generate the depmod configuration file;
  echo add_drivers+=\" %{module} \" > $RPM_SOURCE_DIR/%{module}-dracut.conf   #generate the darcut configuration file;
```

In some embodiments, in the pre-compiling stage of the spec file generated by the driver development platform system, the configuration file which can be automatically loaded by the target operating system can be generated, thus the driver package using the srpm format can include the spec file for generating the configuration file. After the driver package using the srpm format is compiled to the driver package using the rpm format, and the driver package using the rpm format is installed on the target operating system, when the target operating system is restarted, the target operating system can automatically load the driver according to the configuration file, and can accordingly driver the corresponding hardware device to work.

In some embodiments, when compiling, the target operating system can generate the driver file according to the driver source code. The driver file can be in a form of kernel modules, namely the driver file can be in a form of a .ko file.

In some embodiments, after the S503, the method further includes:

S701, storing the driver file into a first path of the first preset directory.

In some embodiments, the driver file can be in the form of kernel modules, namely the driver file can be in the form of the .ko file. The kernel of the Linux operating system includes a directory for storing the file, respectively an internal storage directory and an external storage directory. An internal storage path is mapped onto the internal storage directory, and an external storage path is mapped onto the external storage directory. The internal storage path occupies a volume of the kernel, and the external storage path does not influence the volume of the kernel. In detail, the Linux operating system can store the driver file in the form of the kernel modules into a BUILDROOT sub-directory of a rpmbuild working directory, and a detail path is a path mapped onto the BUILDROOT sub-directory which is the external storage path of the kernel of the Linux operating system, for example a path /lib/modules/%{kernel}/extra. Namely, the first preset directory is the external storage directory of the kernel of the Linux operating system, and the first path is the external storage path of the kernel of the Linux operating system. In one embodiment, the target operating system can execute the code as follows:

```
%install # installing stage;
    install -m 644 -D                                  $RPM_SOURCE_DIR/%{module}.ko
$RPM_BUILD_ROOT/lib/modules/%-{kernel}/extra/%{module}/%{module}.ko
    #assign the installation path of the KO file of the driver package;
    install -m 644 -D                                  $RPM_SOURCE_DIR/%{module}-depmod.conf
$RPM_BUILD_ROOT-/etc/depmod.d/%{module}.conf          #assign the installation
path of the depmod configuration file of the driver package;
    install -m 644 -D                                  $RPM_SOURCE_DIR/%{module}-dracut.conf
$RPM_BUILD_ROOT-/etc/dracut.conf.d/%{module}.conf     #assign the
installation path of the dracut configuration file of the driver package.
```

It can be understood that, the method stores the driver file into the external storage path of the kernel of the Linux operating system, thus the volume of the kernel of the Linux operating system can be not influenced.

S702, storing the configuration files into a second path of a second preset directory.

The target operating system, for example the Linux operating system, can store the configuration file which is automatically loaded when the target operating system is restarted, into the BUILDROOT sub-directory of the rpm-build working directory. In detail, the configuration file is stored into a storage directory of the BUILDROOT sub-directory which is configured to store the configuration file. A storage path is mapped onto the storage directory, for example a storage path etc/depmod.d/%{module}.conf and a storage path/etc/dracut.conf.d. Namely, the second preset directory is the storage directory of the configuration file, and the second path is the storage path of the configuration file. In one embodiment, the target operating system can execute the code as follows:

Thus, the target operating system, for example the Linux operating system, can regenerate the image file of the kernel when the driver package using the srpm format is installed or when the driver package using the srpm format is uninstalled. The image file is the initramfs file.

In one embodiment, the target operating system can execute the code as follows:

```
%post# post-installation phase;
    depmod          # validate the depmod configuration file and the darcut
configuration file;
    dracut -f
%postun         # post-uninstallation phase;
    depmod          #invalidate the depmod configuration file and the darcut
configuration file;
    dracut -f
```

```
%install # installing stage;
    install -m 644 -D                                  $RPM_SOURCE_DIR/%{module}.ko
$RPM_BUILD_ROOT/lib/modules/%-{kernel}/extra/%{module}/%{module}.ko
    #assign the installation path of the KO file of the driver package;
    install -m 644 -D                                  $RPM_SOURCE_DIR/%{module}-depmod.conf
$RPM_BUILD_ROOT-/etc/depmod.d/%{module}.conf          #assign the installation
path of the depmod configuration file of the driver package;
    install -m 644 -D                                  $RPM_SOURCE_DIR/%{module}-dracut.conf
$RPM_BUILD_ROOT-/etc/dracut.conf.d/%{module}.conf     #assign the
installation path of the dracut configuration file of the driver package.
```

S703, regenerating an image file of the kernel, and causing the configuration file to be validated.

In detail, the image file can be an initramfs file. After the driver package using the rpm format is installed on the target operating system, for example the Linux operating system, namely after the target operating system installs the driver package using the rpm format, the target operating system can execute the depmod command and the dracut command, and recompile the initiramfs file of the kernel of the Linux operating system, namely regenerates the image file of the kernel, thus the configuration file which is automatically loaded when the target operating system is restarted can be validation when the driver package using the rpm format is installed. After the driver package using the rpm format is uninstalled from the target operating system, for example the Linux operating system, namely after the target operating system uninstalls the driver package using the rpm format, the target operating system can execute the depmod command and the dracut command, and recompile the initiramfs file of the kernel of the Linux operating system, namely regenerates the image file of the kernel, thus the configuration file which is automatically loaded when the target operating system is restarted can be invalidation when the driver package using the rpm format is uninstalled.

S704, integrating the driver file and the configuration file to a launch list.

The driver development platform system, for example the Linux operating system, can package the driver source code and a corresponding spec file to the driver package using the srpm format. After the driver package using the srpm format is installed on the target operating system (for example the Linux operating system) and is compiled to the driver package using the rpm format, the target operating system (for example the Linux operating system) can integrate the configuration file and the driver file to the launch list.

It can be understood that, when the target operating system (for example the Linux operating system) is restarted, the target operating system can automatically load the file in the launch list. Thus, the target operating system can automatically load the configuration file and the driver file when the target operating system is restarted via integrating the configuration file automatically loaded when the target operating system is restarted and the driver file to the launch list, thus the driver can be automatically loaded.

In some embodiments, when the driver package using the second format is complied during installing the driver package using the first format to the target operating system, the target operating system can obtain the driver package using the second format, and install the driver package using the second format to other one or more electronic devices of which the operating systems each is the same as the target operating system, thus the other one or more electronic device can develop the driver package using the second format. Therefore, many electronic devices can develop the same driver package using the second format, the development is flexibly and rapidly, and is time-saved and power-saved.

In one embodiment, after the S704, the method further includes:

S801, transmitting the driver package using the second format to other one or more preset electronic devices, and prompts the other one or more preset electronic devices to install the driver package using the second format, where the other one or more preset electronic devices each includes an operating system the same as the target operating system.

The other one or more preset electronic devices each includes an operating system the same as the target operating system can be, for example, the target operating system and the operating systems of the other one or more preset electronic devices each is the operating system of which a kernel version is 1.0. In an application scenario, the system for developing driver 1000 shown in FIG. 5 can be taken as an example to illustrate the application scenario of the disclosure. The first electronic device 100 includes the driver development platform system 101. A third electronic device 210 and a fifth electronic device 230 each includes the target operating system 211 of which the kernel version is 1.0.

Figure 5:
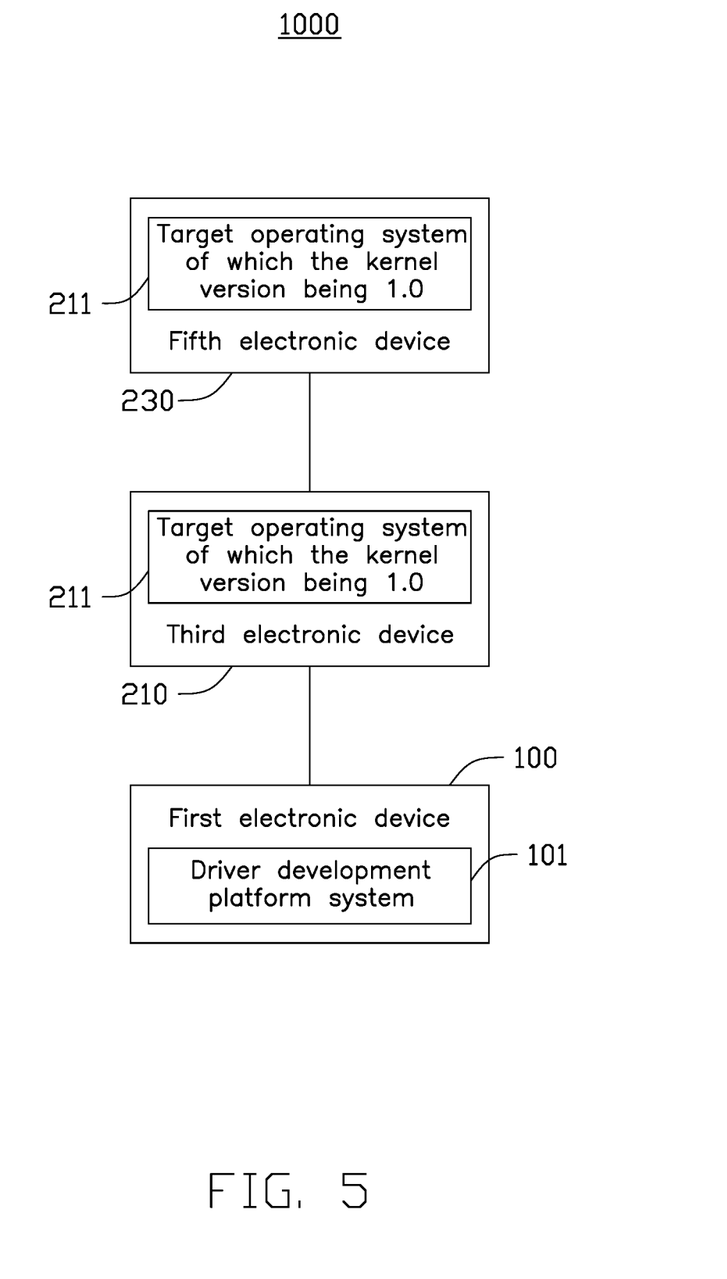
FIG. 5 is an application scenario view of another embodiment of a method for deploying driver.

The driver development platform system 101 can generate the driver package using the srpm format, and transmit the driver package using the srpm format to the third electronic device 210 including the target operating system 211 of which the kernel version is 1.0. The third electronic device 210 can execute the rpm -ivh<srpm> command, and to install the driver package using the srpm format on the third electronic device 210. The third electronic device 210 can further jump to the directory storing the spec file, for example/root/rpmbuild/SPECS/. The third electronic device 210 can further execute the rpm -bb<spec> command, and to complete a compilation of the driver package using the srpm format on the third electronic device 210 including the target operating system 211 of which the kernel version is 1.0. Thus, the driver package using the rpm format which is used to be deployed on the target operating system 211 of which the kernel version is 1.0 can be obtained.

The fifth electronic device 230 can obtain the driver package using the rpm format which is generated by the third electronic device 210. The kernel version of the operating system of the fifth electronic device 230 is 1.0. The fifth electronic device 230 can execute a rpm -ivh<rpm> command, and to install the driver package using the rpm format. And, in response to a restarting of the fifth electronic device 230 having the operating system of which the kernel version is 1.0, the fifth electronic device 230 can automatically load the driver according to the one or more configuration files, and control the hardware device of the fifth electronic device 230 to work normally via the driver.

It can be understood that, the obtained driver package using the rpm format is compiled by the target operating system 211, the driver package using the rpm format can match the environment of the target operating system 211. Thus, the driver package using the rpm format can match the operating system which is the same environment as the target operating system 211. The electronic device generates the driver package using the rpm format according to the driver package using the srpm format, and transmits the driver package using the rpm format to the other one or more electronic devices each having the operating system the same as the electronic device. The other one or more electronic devices does not need to recompile and reconfigure. And after the driver package using the rpm format is installed, each of the other one or more electronic devices can control the corresponding hardware device of the corresponding electronic device to work normally according to the configuration file in response to a restarting of the corresponding electronic device.

It can be understood that, when the driver package using the rpm format is complied during installing the driver package using the srpm format to the target operating system 211, the target operating system 211 can directly transmit and install the driver package using the rpm format to other one or more electronic devices of which the operating systems each is the same as the target operating system 211, thus the other one or more electronic device can develop the same driver package using the second format. Therefore, the development is flexibly and rapidly, and is time-saved and power-saved when many electronic devices develop the driver Thus, the electronic device including the target operating system can transmit the driver package using the second format to other one or more preset electronic device each including an operating system the same as the target operating system, and the other one or more preset electronic devices can receive the driver package using the second format and install the driver package using the second format. Thus, when the driver package using the second format is complied in the target operating system, the target operating system can obtain the driver package using the second format, and install the driver package using the second format to other one or more electronic devices of which the operating systems each is the same as the target operating system, thus the other one or more electronic device can develop the driver package using the second format, and does not need to reconfigure and to recompile anymore. Therefore, many electronic devices can develop the same driver package using the second format, the development is flexibly and rapidly, and is time-saved and power-saved.

Figure 6:
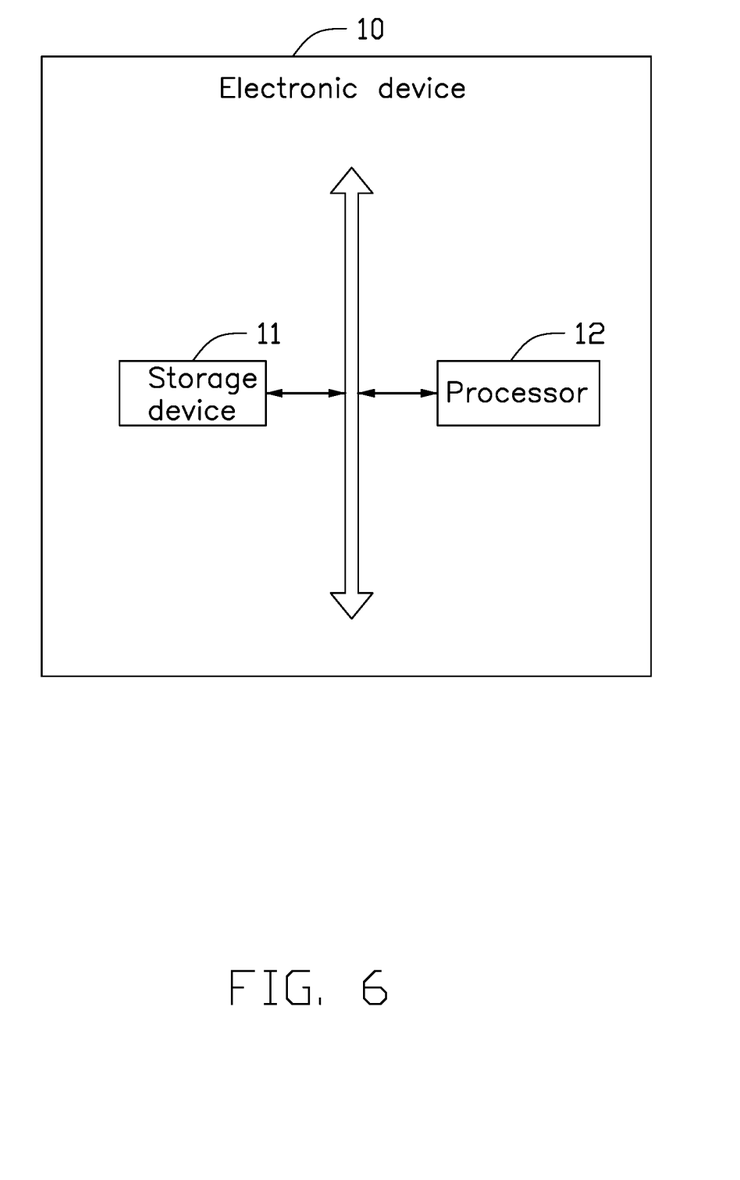
FIG. 6 is a schematic structural view of an embodiment of an electronic device.

Referring to FIG. 6, a block diagram of an electronic device is shown. In one embodiment, the electronic device 10 includes a storage device 11 and at least one processor 12. Those skilled in the art should understand that the structure of the electronic device 10 shown in FIG. 6 does not constitute a limitation of the embodiment of the present disclosure. The electronic device 10 may also include more or less other hardware or software than shown, or have different component arrangements.

In some embodiments, the electronic device 10 includes a terminal that can automatically perform numerical calculation and/or information processing according to pre-set or stored instructions, and its hardware includes, but is not limited to, a microprocessor and an application specific integrated circuit, programmable gate arrays, digital processors and embedded devices, etc. In some embodiments, the storage device 11 may be used to store program codes and various data of computer programs. The storage device 11 may include Read-Only Memory (ROM), Programmable Read-Only Memory (PROM), and Erasable Programmable Read-Only Memory (EPROM), One-time Programmable Read-Only Memory (OTPROM), Electronically-Erasable Programmable Read-Only Memory (EEPROM), Compact Disc Read-Only Memory (CD-ROM) or other optical disk storage, disk storage, magnetic tape storage, or any other non-transitory computer-readable storage medium that can be used to carry or store data.

In some embodiments, the at least one processor 12 may be composed of an integrated circuit. For example, the at least one processor 12 can be composed of a single packaged integrated circuit or can be composed of multiple packaged integrated circuits with the same function or different function. The at least one processor 12 includes one or more microprocessors, one or more digital processing chips, one or more graphics processors, and various control chips. The at least one processor 12 is a control center of the electronic device, and performs various functions of the electronic device 10 and/or processes data by running or executing a software program and/or module stored in the storage device 11 and invoking data stored in the storage device 11. When the foregoing integrated module is implemented in a form of a software functional module, the integrated module may be stored in a computer-readable storage medium. The software functional module is stored in a storage medium and includes several instructions for instructing a computer device (which may be a personal computer, a server, a network device, or the like) or a processor to perform some of the steps of the methods described in the embodiments of this application. The storage device 11 stores program code, and the at least one processor 12 is configured to invoke the program code stored in the storage device 11 to perform the relation function. In some embodiments, the storage device 11 stores a number of program codes. The program codes can be performed by the at least one processor to perform a method for generating driver package and a method for deploying driver. A detail of the at least one processor 12 performing the program codes can refer to the related description of the steps of the method, which will not be described herein.

An embodiment of this application further provides a storage medium. The storage medium stores a computer program code. When the computer program code is run on an electronic device, the electronic device is enabled to perform the method for generating driver package and the method for deploying driver.

A person of ordinary skill in the art may be aware that, in combination with the examples described in the embodiments disclosed in this specification, units and algorithm steps can be implemented by electronic hardware or a combination of computer software and electronic hardware. Whether the functions are performed by the hardware or the software depends on particular applications and design constraint conditions of the technical solutions. A person skilled in the art may use different methods to implement the described functions for each particular application, but it should not be considered that the implementation goes beyond the scope of this application. A person skilled in the art may clearly understand that, for the purpose of convenient and brief description, for a detailed working process of the system and apparatus described above, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms. The units described as separate parts may or may not be physically separate, and parts displayed as units may or may not be physical units, may be located in one location, or may be distributed on a plurality of network units. Some or all of the units may be selected based on an actual requirement to achieve the objectives of the solutions in the embodiments. In addition, functional units in the embodiments of this application may be integrated into one processing unit, or each of the units may exist alone physically, or two or more units are integrated into one unit. It should be noted that, the above are only preferred embodiments and applied technical principles of the present disclosure.

Those skilled in the art should understand that, the present disclosure is not limited to the specific embodiments described herein, and various obvious changes, readjustments and substitutions that are made by those skilled in the art will not depart from the scope of the present disclosure. Therefore, although the present disclosure has been described in detail by the above embodiments, the present disclosure is not limited to the above embodiments, and more other equivalent embodiments may be included without departing from the concept of the present disclosure, and the scope of the present disclosure is determined by the scope of the appended claims.

What is claimed is:

1. A method for deploying driver applied on a second electronic device, the method for deploying driver comprising:
    obtaining a driver package using a first format from a first electronic device;
    installing the driver package using the first format;
    compiling the driver package using the first format to a driver package using a second format which is different from the driver package using the first format;
    the compiling the driver package using the first format to the driver package using the second format further comprising:
    generating one or more configuration files and a driver file according to a driver source code and a specification file, and compiling the driver package using the first format to the driver package using the second format, wherein the driver package using the first format comprises the driver source code and the specification file;
    storing the driver file into a first path of a first preset directory;
    storing the one or more configuration files into a second path of a second preset directory;
    regenerating an image file of a kernel, and causing the one or more configuration files to be validated; and
    integrating the driver file in the first path of the first preset directory and the one or more configuration files in the second path of the second preset directory to a launch list.

2. The method for deploying driver according to claim 1, further comprising:
    transmitting the driver package using the second format to other one or more preset electronic devices, and prompting the other one or more preset electronic devices to install the driver package using the second format, wherein each of the other one or more preset electronic devices comprises an operating system the same as a target operating system of the second electronic device.

3. An electronic device comprising:
a storage device;
at least one processor; and
the storage device storing one or more programs, which when executed by the at least one processor, cause the at least one processor to:
obtain a driver package using a first format from another electronic device;
install the driver package using the first format;
compile the driver package using the first format to a driver package using a second format which is different from the driver package using the first format;
generate one or more configuration files and a driver file according to a driver source code and a specification file, and compile the driver package using the first format to the driver package using the second format, wherein the driver package using the first format comprises the driver source code and the specification file;
store the driver file into a first path of a first preset directory;
store the one or more configuration files into a second path of a second preset directory;
regenerate an image file of a kernel, and cause the one or more configuration files to be validated; and
integrate the driver file in the first path of the first preset directory and the one or more configuration files in the second path of the second preset directory to a launch list.

4. The electronic device according to claim 3, further causing the at least one processor to:
transmit the driver package using the second format to other one or more preset electronic devices, and prompt the other one or more preset electronic devices to install the driver package using the second format, wherein each of the other one or more preset electronic devices comprises an operating system the same as a target operating system of the electronic device.

5. An electronic device comprising:
a storage device;
at least one processor; and
the storage device storing one or more programs, which when executed by the at least one processor, cause the at least one processor to:
obtain a driver package using a first format from another electronic device;
install the driver package using the first format;
compile the driver package using the first format to a driver package using a second format which is different from the driver package using the first format; and
transmit the driver package using the second format to other one or more preset electronic devices, and prompt the other one or more preset electronic devices to install the driver package using the second format, wherein each of the other one or more preset electronic devices comprises an operating system the same as a target operating system of the electronic device.

\* \* \* \* \*